United States Patent
Hackl et al.

(10) Patent No.: US 10,501,056 B2
(45) Date of Patent: Dec. 10, 2019

(54) FASTENING DEVICE FOR A WINDSCREEN WIPING DEVICE

(71) Applicant: Robert Bosch GmbH, Stuttgart (DE)

(72) Inventors: Viktor Hackl, Sopron (HU); Peter Deak, Budapest (HU); Michael Weiler, Buehl (DE)

(73) Assignee: Robert Bosch GmbH, Stuttgart (DE)

( * ) Notice: Subject to any disclaimer, the term of this patent is extended or adjusted under 35 U.S.C. 154(b) by 32 days.

(21) Appl. No.: 14/917,341

(22) PCT Filed: Aug. 7, 2014

(86) PCT No.: PCT/EP2014/067005
§ 371 (c)(1),
(2) Date: Mar. 8, 2016

(87) PCT Pub. No.: WO2015/032581
PCT Pub. Date: Mar. 12, 2015

(65) Prior Publication Data
US 2016/0214574 A1   Jul. 28, 2016

(30) Foreign Application Priority Data
Sep. 9, 2013 (DE) .......... 10 2013 217 985

(51) Int. Cl.
*B60S 1/34* (2006.01)
*B60S 1/38* (2006.01)
(Continued)

(52) U.S. Cl.
CPC ............ *B60S 1/3452* (2013.01); *B60S 1/345* (2013.01); *B60S 1/3468* (2013.01);
(Continued)

(58) Field of Classification Search
CPC ...... B60S 1/3452; B60S 1/345; B60S 1/3468; B60S 1/3801; B60S 1/34; B60S 1/42;
(Continued)

(56) References Cited

U.S. PATENT DOCUMENTS 5,853,229 A   12/1998   Willmann et al.
6,249,929 B1   6/2001   Metz
(Continued)

FOREIGN PATENT DOCUMENTS

CN   1784326 A   6/2006
CN   102947151 A   2/2013
(Continued)

OTHER PUBLICATIONS

International Search Report for Application No. PCT/EP2014/067005 dated Nov. 13, 2014 (English Translation, 3 pages).
(Continued)

*Primary Examiner* — Monica S Carter
*Assistant Examiner* — Katina N. Henson
(74) *Attorney, Agent, or Firm* — Michael Best & Friedrich LLP (57) ABSTRACT

The present invention relates to a windscreen wiping device (100) for a vehicle, comprising a wiper blade (2) with an elongate upper part (10) and an elongate lower part (12), which are configured to be at least partially bendable. Furthermore, a plurality of connecting elements (18) for connecting the upper part (10) and the lower part (12) are provided, said connecting elements being spaced apart from one another along a longitudinal extent (8) of the wiper blade (2) and being designed to permit a movement of the upper part (10) and of the lower part relative to each other with a movement component along a longitudinal extent (8) of the wiper blade (2). Furthermore, the windscreen wiping device (100) comprises a fastening device. The fastening
(Continued)

device comprises a wiper-blade-side fastening part (20) and a fastening element (50). The wiper-blade-side fastening part (20) and the fastening element (50) are configured in such a manner that, by means of rotation of the wiper-blade-side fastening part relative to the fastening element, an engagement can be formed in order to fix a position of the wiper-blade-side fastening part relative to the fastening element.

11 Claims, 6 Drawing Sheets

(51) Int. Cl.
  *B60S 1/40* (2006.01)
  *B60S 1/42* (2006.01)
(52) U.S. Cl.
  CPC .............. *B60S 1/3801* (2013.01); *B60S 1/34* (2013.01); *B60S 1/342* (2013.01); *B60S 1/3427* (2013.01); *B60S 1/3429* (2013.01); *B60S 1/3436* (2013.01); *B60S 1/3438* (2013.01); *B60S 1/3454* (2013.01); *B60S 1/3461* (2013.01); *B60S 1/38* (2013.01); *B60S 1/42* (2013.01); *B60S 2001/3812* (2013.01); *B60S 2001/3825* (2013.01); *B60S 2001/3898* (2013.01)
(58) Field of Classification Search
  CPC ...... B60S 1/3461; B60S 1/3427; B60S 1/342; B60S 1/3429; B60S 1/3436; B60S 1/3438; B60S 1/3454; B60S 2001/3825; B60S 2001/3898; B60S 1/38
  USPC ........ 15/250.361, 250.352, 250.351, 250.34, 15/250.31
  See application file for complete search history.

(56) References Cited

U.S. PATENT DOCUMENTS

| | | | |
|---|---|---|---|
| 6,810,555 B2* | 11/2004 | Ritt | B60S 1/32 15/250.351 |
| 2006/0218740 A1 | 10/2006 | Coughlin | |
| 2016/0159322 A1 | 6/2016 | Weiler et al. | |
| 2017/0210350 A1 | 7/2017 | Hackl et al. | |

FOREIGN PATENT DOCUMENTS

| | | | | |
|---|---|---|---|---|
| DE | 1091888 B | | 10/1960 | |
| DE | 102010040878 A1 | * | 3/2012 | ............ B60S 1/345 |
| DE | 102011005822 A1 | | 9/2012 | |
| DE | 102013214064 A1 | | 5/2014 | |
| EP | 0479659 A1 | | 4/1992 | |
| EP | 1514752 | | 3/2005 | |
| EP | 1514752 A1 | * | 3/2005 | ............ B60S 1/3889 |
| FR | 2103349 A5 | | 4/1972 | |
| FR | 2899857 A1 | | 10/2007 | |
| JP | 0542020 | | 6/1993 | |
| WO | 2005080159 A1 | | 9/2005 | |
| WO | 2008058985 A1 | | 5/2008 | |
| WO | 2009089944 A1 | | 7/2009 | |
| WO | 2012084358 | | 6/2012 | |
| WO | WO 2012084358 A1 | * | 6/2012 | ............ B60S 1/345 |
| WO | 2013087121 | | 6/2013 | |
| WO | 2015032581 A1 | | 3/2015 | |

OTHER PUBLICATIONS

International Search Report for Application No. PCT/EP2015/065787 dated Oct. 12, 2015 (English translation, 3 pages).

* cited by examiner

FASTENING DEVICE FOR A WINDSCREEN WIPING DEVICE

BACKGROUND OF THE INVENTION

The invention relates to a windscreen wiping device for a vehicle, in particular a motor vehicle, furthermore in particular a fastening device for a windscreen wiping device.

Windscreen wiping devices typically have a wiper arm or a wiper lever, wherein a wiper blade is moved on the windscreen of a motor vehicle. The wiper blade is moved between a first turning position and a second turning position. For this purpose, the wiper arm is connected via a drive shaft to a wiper motor. In particular on windscreens with large changes in curvature, the wiper blade easily loses contact with the windscreen. As a result of this, unwiped wiping regions or streaking can occur in particular in the case of windscreens with a high degree of curvature.

Since a wiping procedure must be optimized for a plurality of parameters, such as, for example, a quantity of rain on the windscreen, potential snow load on the windscreen, the velocity of the vehicle and thus inherent wind pressure on the wiper arm, streaking cannot easily be reliably prevented by adjustment of the pressure of the wiper arm on the windscreen. It is therefore necessary to further improve windscreen wiping devices.

In the case of improvement, there are a plurality of marginal conditions which should additionally be taken into account. These include the outlay during production or the production costs, the material costs, and also the properties of the windscreen wiping device, in particular functioning under a wide variety of conditions as well as long service life in a plurality of conditions.

Signs of wear which involve deterioration of the wiping quality normally occur in the case of windscreen wiping devices, particularly in the case of wiper blades, as a result of their regular use. Moreover, as a result of the exposed position of windscreen wiping devices at the front or rear windscreen of motor vehicles, in particular when driving through a car wash, there is the risk that the windscreen wiping device is damaged or even ripped off. In these cases, it is necessary to replace the worn or damaged windscreen wiping devices. The replacement of windscreen wiping devices is conventionally relatively complex since they are normally fastened via screw connections to the drive shaft.

SUMMARY OF THE INVENTION

The object of the present invention is to provide a windscreen wiping device with a fastening device with which at least one or more of the above-mentioned disadvantages are reduced or do not substantially occur.

According to one aspect of the present invention, there is proposed a windscreen wiping device for a vehicle with a fastening element, in particular a motor vehicle. The windscreen wiping device comprises a wiper blade with a longitudinally extended upper part and a longitudinally extended lower part which are configured to be at least partially bendable. Moreover, a plurality of connecting elements for connecting the upper part and the lower part are provided, wherein the connecting elements are spaced apart from one another along a longitudinal extension of the wiper blade. The connecting elements are designed to enable a movement of the upper part and of the lower part relative to one another with a movement component along a longitudinal extension of the wiper blade. Moreover, the windscreen wiping device comprises a fastening device. The fastening device comprises a fastening part on the side of the wiper blade. The fastening part on the side of the wiper blade is configured so that an engagement can be formed by means of a rotation of the fastening part on the side of the wiper blade relative to the fastening element in order to fix a position of the fastening part on the side of the wiper blade relative to the fastening element, in particular to fix it in a detachably connectable manner.

According to a further aspect of the present invention, a method for mounting a windscreen wiper device is made available. The method comprises providing a windscreen wiper device according to the embodiments described above. The method further comprises fastening the fastening part on the side of the wiper blade to the fastening element by forming an engagement of the fastening part on the side of the wiper blade with the fastening element. The fastening part on the side of the wiper blade is rotated relative to the fastening element about a rotational axis which runs substantially transverse to the longitudinal extension of the wiper blade.

According to the windscreen wiper device described herein comprising a fastening device according to the embodiments described herein and by means of the method for mounting the windscreen wiper device, a windscreen wiper device is provided which can be mounted and dismounted in a simple manner. In the event of damage, the windscreen wiping device can correspondingly be easily replaced or easily removed prior to driving through a car wash and subsequently mounted again.

According to embodiments of the disclosure which can be combined with other embodiments described herein, the fastening part on the side of the wiper blade has a first engagement element which is designed in order to form an engagement with a first securing element of the fastening element. A windscreen wiper device is thus provided with a fastening device with which a position of the fastening part on the side of the wiper blade can be fixed relative to the fastening element.

According to embodiments of the disclosure which can be combined with other embodiments described herein, the first engagement element extends substantially transverse to the longitudinal extension of the wiper blade and is preferably formed to be pin-shaped. A fastening device which can be produced easily and at low cost is thus provided.

According to embodiments of the disclosure which can be combined with other embodiments described herein, the fastening part on the side of the wiper blade has a second engagement element which is designed in order to form an engagement with a second securing element of the fastening element. As a result, a windscreen wiper device is provided with a fastening device with which a position of the fastening part on the side of the wiper blade can be fixed relative to the fastening element in a particularly stable manner.

According to embodiments of the disclosure which can be combined with other embodiments described herein, the second engagement element extends substantially transverse to the longitudinal extension of the wiper blade and is preferably formed to be pin-shaped. A fastening device which can be produced easily and at low cost is thus provided with which the fastening part on the side of the wiper blade can be fixed relative to the fastening element in a particularly stable manner.

According to embodiments of the disclosure which can be combined with other embodiments described herein, the first securing element is configured as an elongate arcuate recess, in particular as a curved elongated hole. As a result, a first securing element which can be produced particularly easily and at low cost is provided.

According to embodiments of the disclosure which can be combined with other embodiments described herein, the fastening part on the side of the wiper blade comprises a first guide element and the fastening element comprises a second guide element which are configured to substantially restrict a degree of freedom of movement of the fastening part on the side of the wiper blade perpendicular to the longitudinal extension of the wiper blade during formation of the engagement by means of the rotation of the fastening part on the side of the wiper blade. The mounting and dismounting process can be facilitated by a fastening device with a guide according to the embodiments described herein. A wedging of the engagement and securing elements can in particular be substantially avoided.

According to embodiments of the disclosure which can be combined with other embodiments described herein, the first engagement element is embodied to be elastic. A fastening device is thus provided with which a windscreen wiping device can be mounted and dismounted particularly easily.

According to embodiments of the method for mounting a windscreen wiping device, the fastening of the fastening part on the side of the wiper blade to the fastening element further comprises an elastic deformation of the first engagement element. As a result, a method for mounting a windscreen wiping device can be made available with which a windscreen wiping device can be mounted and dismounted particularly easily.

BRIEF DESCRIPTION OF THE DRAWINGS

Exemplary embodiments of the invention are represented in the figures and are described in greater detail below. In the figures.

DETAILED DESCRIPTION

In the following, unless indicated otherwise, identical reference numbers are used for identical elements with the same action.

Figure 1:
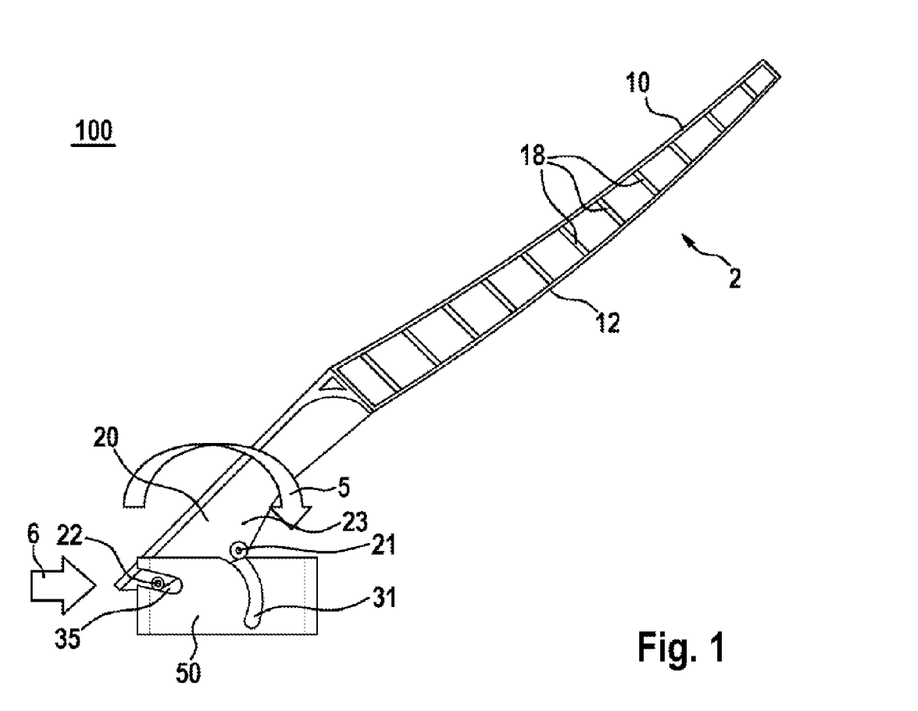
FIG. 1 shows a schematic representation of a windscreen wiping device with a fastening device according to embodiments of the disclosure in an unfastened state.
Figure 2:
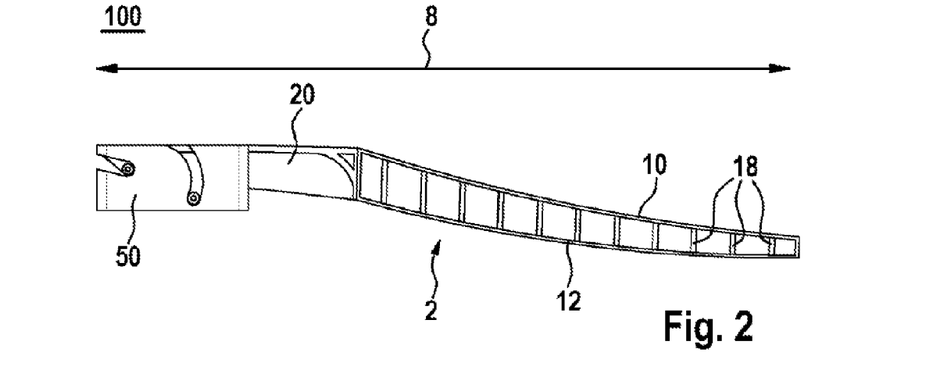
FIG. 2 shows a schematic representation of a windscreen wiping device with a fastening device according to FIG. 1 in a fastened state.

A windscreen wiping device 100 with a fastening device according to embodiments of the disclosure is represented schematically in FIGS. 1 and 2. FIG. 1 shows the windscreen wiping device with the fastening device in an unfastened state and FIG. 2 in an unfastened state. According to embodiments of the disclosure, windscreen wiping device 100 comprises a wiper blade 2 with a longitudinally extended upper part 10 and a longitudinally extended lower part 12 which are configured to be at least partially bendable. Moreover, a plurality of connecting elements 18 for connecting upper part 10 and lower part 12 are provided, wherein connecting elements 18 are spaced apart from one another along a longitudinal extension 8 of windscreen wiping device 100. Connecting elements 18 are designed to enable a movement of upper part 10 and lower part 12 relative to one another with a movement component along a longitudinal extension 8 of windscreen wiping device 100. Moreover, the windscreen wiping device has a fastening device. The fastening device comprises a fastening part 20 on the side of the wiper blade and a fastening element 50. Fastening part 20 on the side of the wiper blade and fastening element 50 are configured so that an engagement can be formed by means of a rotation of fastening part 20 on the side of the wiper blade relative to fastening element 50 in order to fix a position of fastening part 20 on the side of the wiper blade relative to fastening element 50.

According to embodiments which can be combined with other embodiments, fastening part 20 on the side of the wiper blade and fastening element 50 are configured so that by rotating fastening part 20 on the side of the wiper blade relative to fastening element 50 about a rotational axis which runs substantially transverse to longitudinal extension 8 of windscreen wiping device 100, a position of fastening part 20 on the side of the wiper blade can be fixed relative to fastening element 50. Such a rotation for fastening fastening part 20 on the side of the wiper blade to fastening element 50 is illustrated in FIG. 1 by way of example by arrow 5.

A windscreen wiper device which can be mounted and dismounted easily is provided by the embodiments described herein. The windscreen wiping device can correspondingly be easily replaced in the event of damage or easily removed prior to driving through a car wash and subsequently mounted again.

Figure 3:
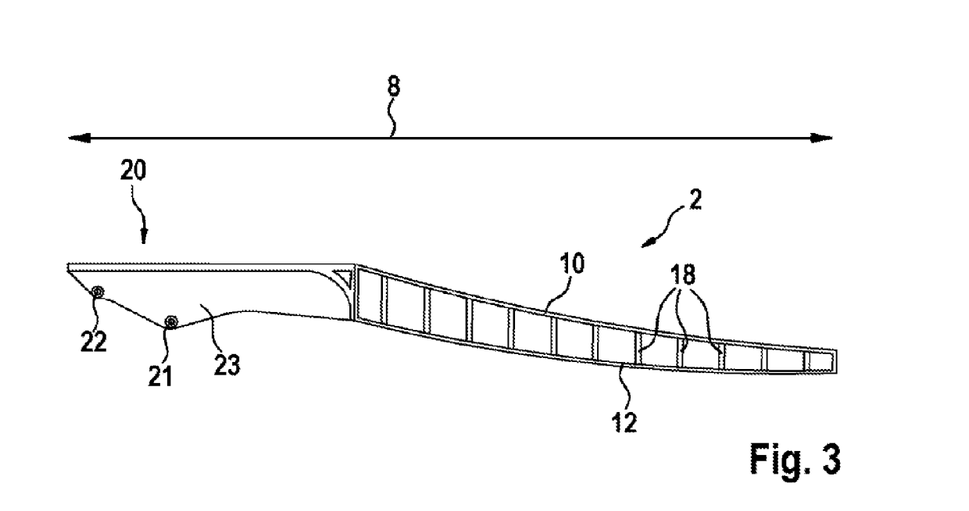
FIG. 3 shows a schematic representation of a wiper blade with a fastening part on the side of the wiper blade according to embodiments of the disclosure.

As is represented by way of example in FIGS. 1 to 3, fastening part 20 on the side of the wiper blade according to embodiments of the windscreen wiping device which can be combined with other embodiments can have a first engagement element 21. First engagement element 21 is typically designed in order to form an engagement with a first securing element 31 of fastening element 30. According to embodiments described herein, first engagement element 21 can form an engagement with first securing element 31 by a rotation about a rotational axis (see arrow 5 in FIG. 1) which runs substantially transverse to longitudinal extension 8 of windscreen wiping device 100.

As is shown by way of example in FIGS. 1 to 3, first engagement element 21 can be configured so that it extends substantially transverse to longitudinal extension 8 of windscreen wiping device 100. First engagement element 21 of windscreen wiping device 100 preferably extends at an angle of 90° relative to longitudinal extension 8. According to embodiments of the disclosure, first engagement element 21 can be formed to be pin-shaped. A windscreen wiping device can thus be provided which has a simple fastening device so that the wiper blade can be mounted and dismounted quickly and in an uncomplicated manner. The embodiments described herein furthermore make available a windscreen wiping device which can be produced at low cost.

According to embodiments of the windscreen wiping device which can be combined with other embodiments, fastening part 20 on the side of the wiper blade has a second engagement element 22 which is represented by way of example in FIGS. 1 to 3. Second engagement element 22 is typically designed in order to form an engagement with a second securing element 35 of fastening element 30. According to embodiments described herein, an engagement can be formed by a linear movement of second engagement element 22 of fastening part 20 on the side of the wiper blade relative to second securing element 35 of fastening element 30. Such a linear movement of fastening part 20 on the side of the wiper blade relative to fastening element 50 is illustrated in FIG. 1 by way of example by arrow 6. The end position of second engagement element 22, i.e. the position in which second engagement element 22 in second securing element 35 forms a shoulder, typically fixes the position of the rotational axis about which fastening part 20 on the side of the wiper blade is rotated relative to fastening element 50 during mounting or dismounting.

According to embodiments of the windscreen wiping device which can be combined with other embodiments, first engagement element 21 and second engagement element 22 of fastening part 20 on the side of the wiper blade are arranged relative to one another so that a state of tension of engagement elements 21, 22 is generated during formation of an engagement of first engagement element 21 with first securing element 31 and during formation of an engagement of second engagement element 22 with second securing element 35.

According to embodiments of the windscreen wiping device which can be combined with other embodiments, first engagement element 21 and/or second engagement element 22 of fastening part 20 on the side of the wiper blade can be embodied to be elastic. As a result, a substantially continuous formation of the state of tension of the engagement elements can be achieved during fastening of fastening part 20 on the side of the wiper blade to fastening element 50.

As is shown by way of example in FIGS. 1 to 3, second engagement element 22 can be configured so that it extends substantially transverse to longitudinal extension 8 of windscreen wiping device 100. Second engagement element 22 of windscreen wiping device 100 preferably extends at an angle of 90° relative to longitudinal extension 8. Just like first engagement element 21, second engagement element 22 can be formed to be pin-shaped. According to the embodiments described herein, a particularly effective and stable fastening device can thus be provided.

According to embodiments of the windscreen wiping device which can be combined with other embodiments, fastening part 20 on the side of the wiper blade has a first guide element 23. As is represented by way of example in FIG. 3, first guide element 23 can be embodied as a web which extends substantially along a longitudinal extension 8 of windscreen wiping device 100. First guide element 23 is typically arranged centrally in terms of the width of windscreen wiper device 100. Moreover, according to embodiments described herein, first guide element 23 of fastening part 20 on the side of the wiper blade is configured in order to enable a guided rotational movement and/or guided linear movement of fastening part 20 on the side of the wiper blade relative to fastening element 50 with a second guide element 33 of fastening element 30. An exemplary second guide element 33 of fastening element 30 according to embodiments of the windscreen wiping device is represented in FIG. 4B. According to typical embodiments, second guide element 33 of fastening element 30 is configured as a slot so that first guide element 23 embodied as a web can be guided in a plane in the direction of longitudinal extension 8 of the windscreen wiping device during mounting or dismounting.

First guide element 23 of fastening part 20 on the side of the wiper blade and second guide element 33 of fastening element 30 are typically configured in order to substantially restrict a degree of freedom of movement of fastening part 20 on the side of the wiper blade in a direction along the rotational axis of the rotational movement during formation of the engagement during formation of the engagement by means of the rotation of fastening part 20 on the side of the wiper blade relative to fastening element 50. The mounting and dismounting process can be facilitated by a fastening device with a guide according to the embodiments described herein. In particular, a wedging of the engagement and securing elements can be significantly avoided.

Figure 4A:
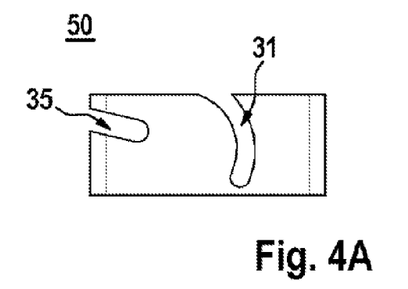
FIG. 4A shows a side view of the fastening element of the fastening device according to embodiments of the disclosure.
Figure 4B:
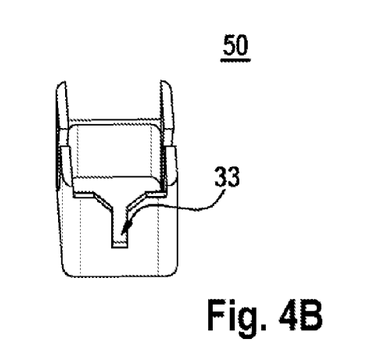
FIG. 4B shows a perspective front view of the fastening element of the fastening device according to embodiments of the disclosure.

FIG. 4 represents by way of example fastening element 50 of the fastening device according to embodiments of the disclosure, wherein FIG. 4A shows a side view and FIG. 4B shows a perspective front view of fastening element 30 of the fastening device. First securing element 31 is typically configured so that a state of tension of first engagement element 21 is formed during formation of an engagement of first engagement element 21 with first securing element 31. For example, first securing element 31 can be configured as an elongated arcuate recess, in particular as a bent elongated hole. The arcuate recess is typically configured such that a distance between the contact surface of second engagement element 22 with second securing element 35 and the contact surface of first engagement element 21 with first securing element 31 increases. The increase in the distance between the contact surface of second engagement element 22 with second securing element 35 and the contact surface of first engagement element 21 with first securing element 31 is typically continuous, wherein, in a fastened state of the windscreen wiping device, the stated distance between the contact surfaces is greater than the distance between first engagement element 21 and second engagement element 22 of fastening part 20 on the side of the wiper blade in an unfastened state. A state of tension of the engagement elements is thus generated in the fastened state.

According to embodiments of the disclosure which can be combined with other embodiments described herein, the arcuate recess, for example, a curved elongated hole, is configured such that a distance between the contact surface of second engagement element 22 with second securing element 35 and the contact surface of first engagement element 21 with first securing element 31 initially increases during formation of an engagement of first engagement element 21 with first securing element 31 until a maximum distance is reached and subsequently reduces again up to a latching position. The increase and/or the reduction in the distance between the contact surface of second engagement element 22 with second securing element 35 and the contact surface of first engagement element 21 with first securing element 31 is typically continuous, wherein, in a fastened state of the windscreen wiping device, the stated distance between the contact surfaces is greater than the distance between first engagement element 21 and second engagement element 22 of fastening part 20 on the side of the wiper blade in an unfastened state. A state of tension of the engagement elements is thus generated in the fastened state.

As a result of the configuration of a fastening device described herein in which the distance between the contact surface of second engagement element 22 with second securing element 35 and the contact surface of first engagement element 21 with first securing element 31 initially increases and subsequently decreases during formation of an engagement, a maximum state of tension must be overcome during formation of the engagement so that a latching-in or catching mechanism, in particular a continuous latching-in or catching mechanism is provided. The first engagement element is typically elastically deformed when overcoming the maximum state of tension. A fastening device is thus provided with which a windscreen wiping device can be mounted and dismounted particularly easily.

Exemplary embodiments of a windscreen wiping device are described below for which the fastening device described herein can be advantageously used. In principle, the fastening device described herein can, however, also be used for other windscreen wiping devices.

Figure 5A:
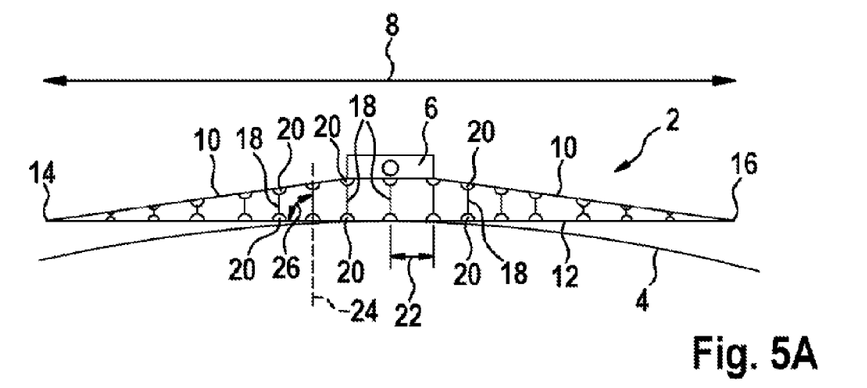
FIG. 5A shows a schematic representation of a wiper blade of a windscreen wiping device according to embodiments of the disclosure in a normal position.
Figure 5B:
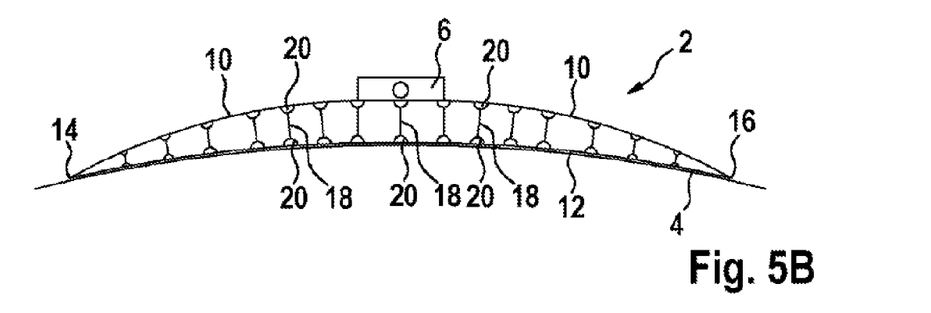
FIG. 5B shows a schematic representation of the wiper blade of a windscreen wiping device according to embodiments of the disclosure according to FIG. 5A in a position placed on a windscreen.

FIGS. 5A and 5B show schematic representations of a wiper blade 2 in a normal position (FIG. 5A) and in a position placed on a windscreen (FIG. 5B) according to embodiments of the windscreen wiping device of the disclosure. Wiper blade 2 serves to wipe a windscreen 4 of a vehicle which is, for example, a motor vehicle, in particular a car. Wiper blade 2 is conventionally fitted on a windscreen wiping arm which is driven for wiping by means of a motor. For this purpose, wiper blade 2 has a holder 6 to which it can be fastened on the windscreen wiper arm. Wiper blade 2 is located in FIG. 5A in a normal position in which it is raised up at least partially from windscreen 4. Wiper blade 2 has a longitudinal extension 8 and has a longitudinally extended upper part 10 and an also longitudinally extended lower part 12. The longitudinal extensions of upper part 10 and of lower part 12 correspond substantially to longitudinal extension 8 of wiper blade 2.

Both upper part 10 and lower part 12 are bendable beams or can be configured as bendable beams which are formed in each case in one piece by way of example in FIGS. 5A and 5B. This enables a particularly stable construction. It is also possible to form in each case only a part of upper part 10 and/or of lower part 12 to be bendable. Moreover, it is alternatively possible to configure upper part 10 in two parts, wherein in each case one of both parts of two-part upper part 10 is fastened to holder 6.

According to some embodiments which can be combined with the other embodiments described here, a material is used for upper part 10 and/or lower part 12, which material has a modulus of elasticity which lies in a range between 0.005 kN/mm$^2$ and 0.5 kN/mm$^2$, in particular 0.01 kN/mm$^2$ and 0.1 kN/mm$^2$. This enables a suitable bending capacity of upper part 10 and of lower part 12. An optimum bending rigidity is produced together with a suitably configured cross-sectional surface of upper part 10 and of lower part 12. Upper part 10 and lower part 12 are arranged so that they are opposite one another. Both ends of upper part 10 are connected fixedly at outer connecting positions 14 and 16 to in each case one end of lower part 12. Upper part 10 and lower part 12 are otherwise spaced apart from one another.

Upper part 10 and lower part 12 are connected to one another by connecting elements 18. Particularly in the normal position of wiper blade 2, these run approximately transverse to longitudinal extension 8 of wiper blade 2. Connecting elements 18 are fastened to inner longitudinal sides, facing one another, of upper part 10 and of lower part 12 by means of swivel joints 20. Swivel joints 20 are hinges here. In particular, swivel joints 20 can be formed as integral hinges. This is above all advantageous if upper part 10, lower part 12 and/or connecting elements 18 are produced from a plastic material or are covered with a suitable plastic material.

According to typical embodiments described here which can be combined with other embodiments described here, a swivel joint is selected from the following group, comprising: a hinge, an integral hinge, a tapering of the material to generate lower rigidity along a torsional axis, a joint with a rotational axis, a means for connecting the upper part to the connecting element or for connecting the lower part to the connecting element which allows the displacement of the lower part in relation to the upper part along the longitudinal extension, etc.

Embodiments in which the joint is made available by an integral hinge thus make available a very simple manner for making available the joints for a fin ray wiper. Wiper blade 2 can be made available in one part, in particular tooling-free. According to typical embodiments, the windscreen wiping device, in particular the wiper blade is produced from one or more materials from the group comprising: TPE (thermoplastic elastomer), for example, TPE-S, TPE-O, TPE-U, TPE-A, TPE-V and TPE-E. The integral hinges can have a high extensibility. This can, for example, be made available by a material selected from the group PP, PE, POM and PA. The integral hinges can alternatively be produced from one or more materials from a group comprising: TPE (thermoplastic elastomer), for example, TPE-S, TPE-O, TPE-U, TPE-A, TPE-V and TPE-E.

Connecting elements 18 are spaced apart from one another along the longitudinal extension of wiper blade 2. The distances between in each case two adjacent connecting elements 18 are identical. They can, however, also be selected to be different. The distances are advantageously smaller than 50 mm, in particular smaller than 30 mm. A particularly high flexibility of the windscreen wiping device, in particular of its lower part, and good adjustment to the curvature and changes in curvature of the windscreen to be wiped can be ensured as a result.

A distance 22 is represented in FIG. 5A to be representative of the distances between in each case two connecting elements 18. Connecting elements 18 are, in particular in the normal position of wiper blade 2, fastened to lower part 12 so that their longitudinal axes run at angles 26 to lower part 12 which lies between 65° and 115°, in particular between 75° and 105°. The angles particularly preferably lie between 80° and 100°. This advantageously ensures good transmission of a force acting on the lower part to the upper part. A particularly stable windscreen wiping device can furthermore be achieved in this manner. The same also applies to the fastenings of connecting elements 18 to upper part 10.

A longitudinal axis 24 and by way of example for the angles between connecting elements 18 and lower part 12 an angle 26 are represented in FIG. 5A by way of example for the longitudinal axes of connecting elements 18. The distances between upper part 10 and lower part 12 are above all determined by the lengths of connecting elements 18. The lengths of connecting elements 18 increase, starting from both outer connecting positions 14, 16 up to approximately those positions on which holder 6 attached to upper part 10 begins. As a result, upper part 10 and lower part 12 form, in the side view of wiper blade 2 according to FIG. 5A, a double wedge, wherein the tips of both wedges point in opposite directions. Connecting elements 18 are designed to be resistant to buckling.

FIG. 5B shows a schematic representation of wiper blade 2 according to FIG. 5A in a position placed against windscreen 4. Since windscreen 4 has a curvature, contact compressive forces act on lower part 12 when placing wiper blade 2 on windscreen 4. Since upper part 10 and lower part 12 are bendable beams and connecting elements 12 are mounted rotatably on upper part 10 and lower part 12, upper part 10 and lower part 12 are displaceable relative to one another. As a result of the compressive forces acting from below on lower part 12, wiper blade 2 bends in that direction from which the compressive forces come, and is placed precisely on the curvature of windscreen 4.

As a result of the structure of the embodiments described here, a bending of the lower part takes place in the direction from which the force acts in the case of an action of force on the lower part (by windscreen 4). This is ensured by the connection of upper part 10 and of the lower part at connecting positions 14 and/or 16, the form, and by swivel joints at the connection between the connecting elements and the upper or lower part.

A small distance is present in the representation according to FIG. 5B between wiper blade 2 and windscreen 4, which small distance only serves here to illustrate windscreen 4 and wiper blade 2 and which in reality is largely thus not present during placing of wiper blade 2 on windscreen 4. A wiper lip, which sits on windscreen 4 for wiping, is furthermore typically found on the underside, facing away from upper part 10, of lower part 12. For reasons of clarity, the wiper lip is not represented in FIGS. 5A and 5B.

A windscreen wiping device according to embodiments described here uses the effect of tail fins of certain fish which do not escape in the pressure direction in the case of lateral pressure, but rather arch in the opposite direction, i.e. in the direction from which the pressure comes. This principle is also referred to as the "fin ray" principle. As a result, a windscreen wiping device according to the embodiments described herein has the advantage of improved adjustment to a windscreen of a motor vehicle. In the case of a conventional windscreen wiper blade, its upper part is normally rigid, i.e. it is not formed to be bendable.

FIGS. 5A and 5B show a wiper blade 2 with a longitudinal extension 8 which extends substantially between connecting positions 14 and 16. Such an arrangement is often used for front windscreen wipers. Alternatively, a windscreen wiping device can, however, also only have one connecting position which, analogous to FIGS. 5A and 5B, corresponds to a halving of the windscreen wiping device, and wherein, for example, a rotational axis is provided at a position of holder 6. Such an arrangement is frequently used for rear windscreen wipers. This is represented by way of example among others in FIGS. 6A and 6B. Optional configurations and details, as they are described in the individual embodiments, can generally be used for both variants of an arrangement of a windscreen wiping device.

Figure 6A:
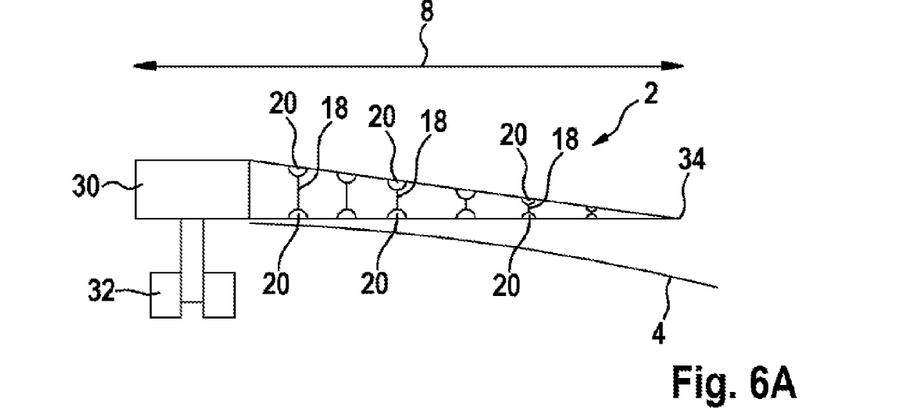
FIG. 6A shows a schematic representation of a further exemplary embodiment of a windscreen wiping device according to the invention in the form of a wiper arm with an integrated wiper blade in a normal position.

FIG. 6A shows a schematic representation of a further exemplary embodiment of the windscreen wiping device according to the invention in the normal position. The windscreen wiping device is here a wiper arm with an integrated wiper blade 2 which is attached to a fastening part 30. Fastening part 30 is connected to a wiper motor 32 which drives fastening part 30 for wiping windscreen 4. Wiper blade 2 is configured to be wedge-shaped, wherein one end of upper part 10 at an outer connecting position 34 is connected fixedly to an end of lower part 12. The respective other end of upper part 10 and of lower part 12 are fastened to fastening part 30. In terms of the fundamental structure and in particular the fastenings of connecting elements 18, the windscreen wiping device according to FIG. 6A corresponds in principle to those according to FIG. 5A.

Figure 6B:
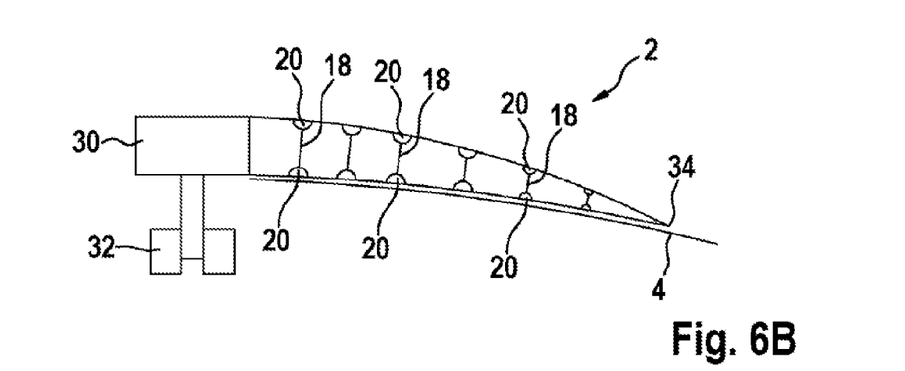
FIG. 6B shows a schematic representation of the wiper blade with integrated wiper blade according to FIG. 6A in a position placed on a windscreen.

FIG. 6B shows a schematic representation of wiper blade 2 with integrated wiper arm 30 according to FIG. 5B in a position placed on windscreen 4. Here too, compressive forces act on lower part 12 of wiper blade 2 from below from the direction of windscreen 4 so that lower part 12 and upper part 10 bend in the direction of windscreen 4.

Both in FIG. 5A and in FIG. 6A, the wiper blade is represented in its position not placed on the windscreen such that lower part 12 is formed to be substantially straight. According to yet further embodiments which can be combined with other embodiments, the lower part in the unloaded state is formed to be convex, i.e. with a bulge which projects away from the upper part in a central region. The windscreen wiping device according to the embodiments described here can typically, in the event of contact with a windscreen, proceeding from the convex form of the lower part, then assume the corresponding concave form of the lower part which is adapted to the windscreen.

Figure 7:
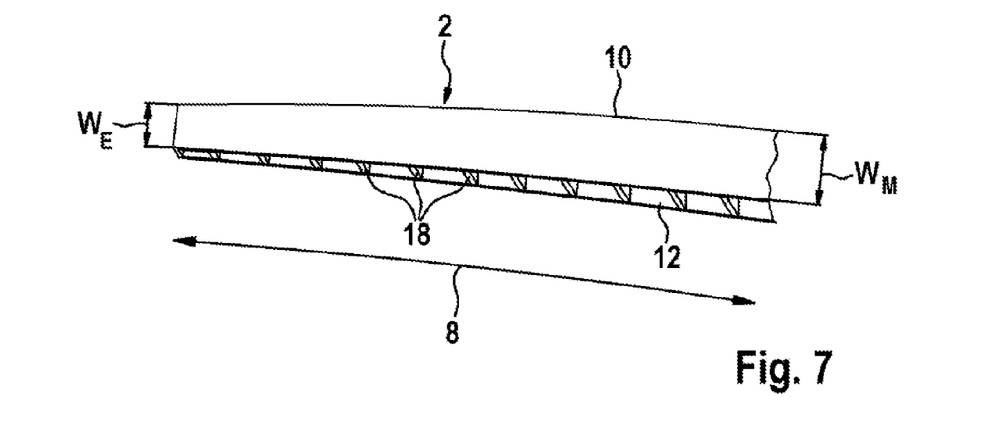
FIG. 7 shows a schematic perspective representation of a wiper arm of a windscreen wiping device according to embodiments of the disclosure.

FIG. 7 shows a schematic perspective representation of a wiper blade 2 of a windscreen wiper device according to embodiments of the disclosure. As is represented in FIG. 7, wiper blade 2 has an outer width $W_E$ at the outer connecting positions at which the ends of longitudinally extended upper part 10 and of lower part 12 are connected to one another. According to typical embodiments, outer width $W_E$ is at least 15 mm, in particular at least 20 mm, in particular at least 25 mm.

According to embodiments of the disclosure which can be combined with other embodiments, the width of wiper blade 2 increases from the outer connecting positions in the direction of fastening part 30 or holder 6 to which the wiper blade can be fastened on the windscreen wiper arm. An inner width is designated by $W_M$ by way of example in FIG. 7. According to typical embodiments, inner width $W_M$ is at least 20 mm, in particular at least 25 mm, in particular at least 30 mm.

Figure 8A:
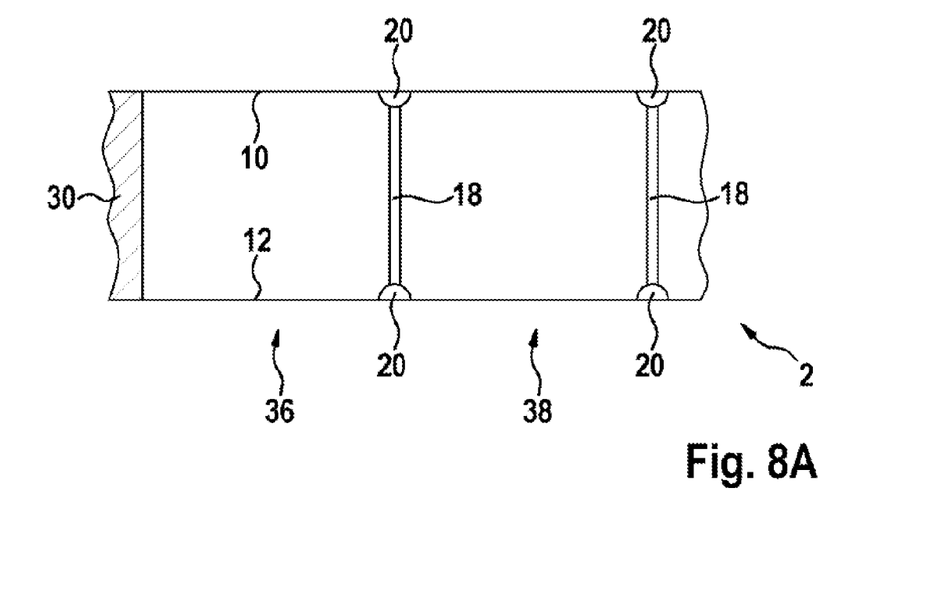
FIG. 8A shows a schematic representation of a cut-out of the wiper blade according to FIG. 6A.

FIG. 8A shows a schematic representation of a cut-out of wiper blade 2 according to the exemplary embodiment according to FIG. 6A in which wiper blade 2 is located in the normal position. The left end region of wiper blade 2 in which one end of upper part 10 and one end of lower part 12 are fastened to fastening part 30 is represented. FIG. 8A shows, proceeding from the transition from fastening part 30 to wiper blade 2, first two connecting elements 18 which delimit two wiper blade elements 36 and 38. Connecting elements 18 are fastened via swivel joints 20 to upper part 10 and lower part 12.

Figure 8B:
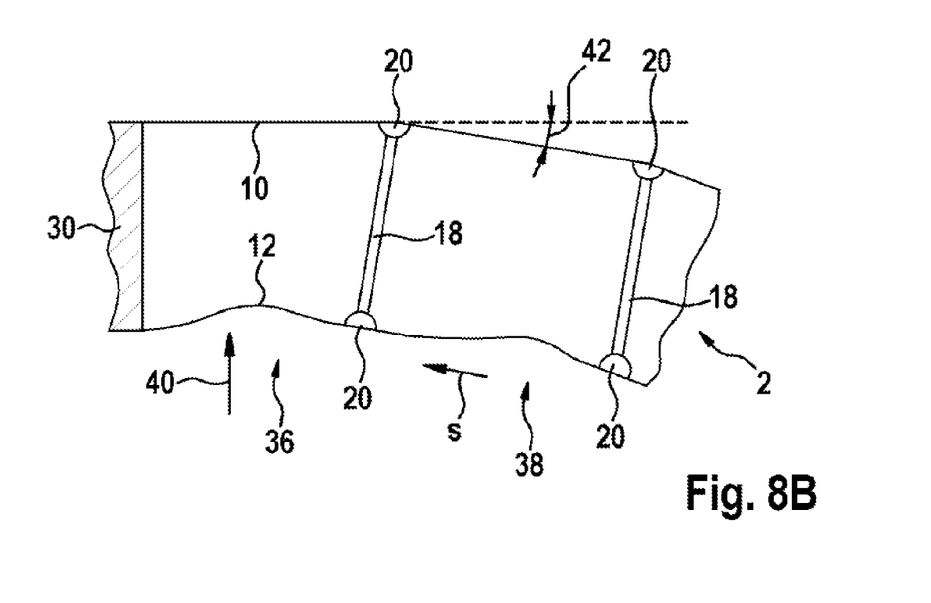
FIG. 8B shows a schematic representation of a cut-out of the wiper blade according to FIG. 6B.

FIG. 8B shows a schematic representation of a cut-out of wiper blade 2 according to the exemplary embodiment according to FIG. 6B in which wiper blade 2 is placed on windscreen 4. Compressive forces act on lower part 12 from below from the direction of the windscreen. A compressive force 40 is represented in FIG. 8B representatively for the compressive forces. Compressive force 40 brings about an arching and bending of lower part 12 of wiper blade element 36. As a result, swivel joint 20 of first connecting element 18 is displaced to the left by a travel s. Second wiper blade element 38 bends downwards in the direction from which compressive force 40 comes and adapts itself to the windscreen. An angle 42 is thereby generated between first wiper blade element 36 and second wiper blade element 38. A further compressive force which then acts on lower part 12 of second wiper blade element 38 and prevents a further bending of second wiper blade element 38 downwards is furthermore formed. A chain reaction is generated to right-hand adjacent wiper blade element up to the end of wiper blade 2.

Figure 9:
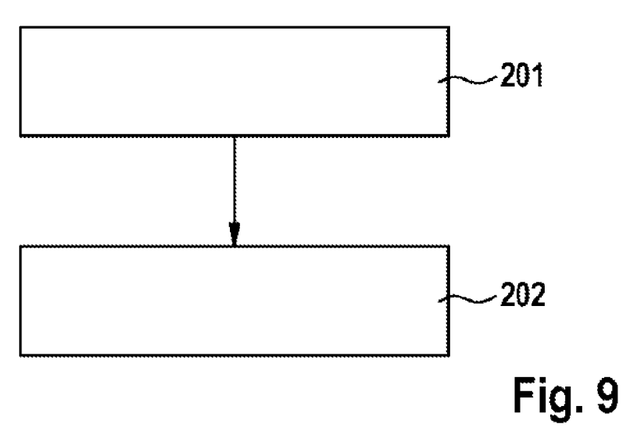
FIG. 9 shows a flow chart to illustrate embodiments of the method for mounting a windscreen wiper device according to embodiments of the disclosure.

A flow chart is represented in FIG. 9 in order to illustrate embodiments of the method for mounting a windscreen wiper device. According to embodiments of the method, the method comprises providing 201 a windscreen wiper device according to the embodiments described herein. Moreover, it further comprises a fastening 202 of fastening part 20 on the side of the wiper blade to fastening element 50 by forming an engagement of fastening part 20 on the side of the wiper blade with fastening element 50 and rotating the fastening part on the side of the wiper blade relative to the fastening element about a rotational axis which runs substantially transverse to longitudinal extension 8 of windscreen wiping device 100.

According to embodiments of the method for mounting a windscreen wiping device, fastening 202 of fastening part 20 on the side of the wiper blade to fastening element 50 further comprises an elastic deformation of first engagement element 21 and/or of second engagement element 22.

According to embodiments of the method for mounting a windscreen wiper device which can be combined with other embodiments, fastening 202 of fastening part 20 on the side of the wiper blade to fastening element 50 comprises the formation of a state of tension of first engagement element 21 and/or or second engagement element 22. First engagement element 21 and second engagement element 22 of fastening part 20 on the side of the wiper blade as well as first securing element 31 and second securing element 35 of the fastening element are configured according to the embodiments described herein.

A windscreen wiper device which can be mounted and dismounted in a simple manner is thus provided by the embodiments described herein of the windscreen wiper device and by the method for mounting the windscreen wiper device. The windscreen wiping device can correspondingly be easily replaced in the event of damage or easily removed prior to driving through a car wash and subsequently mounted again.

What is claimed is:

1. A windscreen wiping device (100) for a vehicle with a fastening element (50), comprising a wiper blade with
    a longitudinally extended upper part (10) which is configured to be at least partially bendable,
    a longitudinally extended lower part (12) which is configured to be at least partially bendable,
    a plurality of connecting elements (18) for connecting the upper part (10) and the lower part (12), wherein the connecting elements (18) are spaced apart from one another along a longitudinal extension (8) of the wiper blade (2), and wherein the connecting elements (18) are designed to enable a movement of the upper part (10) and of the lower part relative to one another with a movement component along the longitudinal extension (8) of the wiper blade (2), and
    a fastening device comprising a fastening part (20) on a side of the wiper blade, wherein the fastening part (20) on the side of the wiper blade is configured so that an engagement can be formed by means of a rotation of the fastening part (20) on the side of the wiper blade relative to the fastening element (50) in order to fix a position of the fastening part (20) on the side of the wiper blade relative to the fastening element (50),
    wherein the fastening part (20) includes a first, elastic pin (21) extending perpendicular to the longitudinal direction, and a second pin (22) spaced from the first pin (21) and extending perpendicular to the longitudinal direction, wherein the fastening element (50) includes a first, arcuate-shaped recess (31) that receives the first pin (21) during assembly of the fastening part (20) onto the fastening element (50), and wherein the fastening element (50) includes a second, elongated linear recess (35) that receives the second pin (22) during assembly of the fastening part (20) onto the fastening element (50), wherein the arcuate-shaped recess is an elongated bent recess that curves about an axis that is spaced from the arcuate-shaped recess, wherein the first pin (21) is configured to travel along an arcuate pathway along the arcuate-shaped recess (31) during the engagement, and is configured to be elastically deformed as it travels along the arcuate-shaped recess (31).

2. The windscreen wiping device (100) as claimed in claim 1, wherein the fastening part (20) on the side of the wiper blade comprises a first guide element (23) and the fastening element (50) comprises a second guide element (33) which are configured to substantially restrict a degree of freedom of movement of the fastening part (20) on the side of the wiper blade perpendicular to the longitudinal extension (8) of the wiper blade (2) during formation of the engagement by means of the rotation of the fastening part (20) on the side of the wiper blade relative to the fastening element (50).

3. A method for mounting a windscreen wiper device, comprising:
    providing (201) a windscreen wiping device as claimed in claim 1,
    fastening (202) the fastening part (20) on the side of the wiper blade to the fastening element (50) by forming an engagement of the fastening part (20) on the side of the wiper blade with the fastening element (50) and rotating the fastening part on the side of the wiper blade relative to the fastening element about a rotational axis which runs substantially transverse to the longitudinal extension (8) of the wiper blade (2).

4. The method for mounting a windscreen wiper device as claimed in claim 3, wherein the fastening (202) of the fastening part (20) on the side of the wiper blade to the fastening element (50) further comprises an elastic deformation of the first engagement element (21).

5. The windscreen wiping device (100) as claimed in claim 1, wherein the fastening part (20) on the side of the wiper blade is configured so that an engagement can be formed by means of a rotation of the fastening part (20) on the side of the wiper blade relative to the fastening element (50) in order to fix a position of the fastening part (20) on the side of the wiper blade relative to the fastening element (50) in a detachably connectable manner.

6. The windscreen wiping device (100) as claimed in claim 1, wherein the first pin (21), the second pin (22), the first recess (31), and the second recess (35) are arranged such that when the fastening part (20) is being rotated and assembled onto the fastening element (50), the first pin (21) experiences an increase in tension applied thereto as it travels along the arcuate pathway and is thereby elastically deformed.

7. The windscreen wiping device (100) as claimed in claim 1, wherein the second, linear recess extends along an axis that intersects the first, arcuate recess, and wherein the first, arcuate recess is non-concentric with respect to the second, linear recess.

8. The windscreen wiping device (100) as claimed claim 1, wherein the first securing element opens along a first edge of the fastening element (50) and the second securing element opens along a second edge of the fastening element (50), and wherein the first edge is perpendicular to the second edge.

9. The windscreen wiping device (100) as claimed in claim 1, wherein the rotation is about an axis that is perpendicular to an axis of rotation of the wiping device during use on a windshield.

10. The windscreen wiping device (100) as claimed in claim 1, wherein the fastening part (20) includes a first guide element (23) that is a web, and wherein the first, elastic pin (21) extends perpendicularly from a lateral surface of the web.

11. The windscreen wiping device (100) as claimed in claim 2, wherein the first guide element (23) is a web and the second guide element (33) is a slot configured to receive the web.

* * * * *